United States Patent
Ebner et al.

(10) Patent No.: US 12,254,665 B2
(45) Date of Patent: Mar. 18, 2025

(54) SYSTEM AND METHOD TO DETECT LEDS AND THEIR STATES IN AN AR CONTEXT

(71) Applicant: CareAR Holdings LLC, Norwalk, CT (US)

(72) Inventors: Fritz Ebner, Pittsford, NY (US); Kevin Summers, Richardson, TX (US); Ashish Tisgaonkar, Rochester, NY (US)

(73) Assignee: CareAR Holdings LLC, Norwalk, CT (US)

( * ) Notice: Subject to any disclaimer, the term of this patent is extended or adjusted under 35 U.S.C. 154(b) by 381 days.

(21) Appl. No.: 17/804,730

(22) Filed: May 31, 2022

(65) Prior Publication Data

US 2023/0386170 A1    Nov. 30, 2023

(51) Int. Cl.
    *G06V 10/60*    (2022.01)
    *G06V 10/44*    (2022.01)
    *G06V 20/20*    (2022.01)

(52) U.S. Cl.
    CPC ............ *G06V 10/60* (2022.01); *G06V 10/443* (2022.01); *G06V 20/20* (2022.01)

(58) Field of Classification Search
    CPC ....... G06V 10/60; G06V 10/443; G06V 20/20
    See application file for complete search history.

(56) References Cited

U.S. PATENT DOCUMENTS

| | | | |
|---|---|---|---|
| 2017/0206417 A1* | 7/2017 | Aoyama | H04L 1/0061 |
| 2018/0247498 A1* | 8/2018 | Friar | G08B 1/08 |
| 2018/0261060 A1* | 9/2018 | Siminoff | G08B 25/08 |
| 2019/0026939 A1* | 1/2019 | Frankel | G06T 7/70 |
| 2019/0143204 A1* | 5/2019 | Aman | A63F 13/50 463/31 |
| 2021/0239988 A1* | 8/2021 | Kobayashi | G02B 27/0172 |
| 2021/0410201 A1* | 12/2021 | Kim | G06V 20/20 |
| 2023/0230462 A1* | 7/2023 | Lum | G08B 5/36 362/85 |

* cited by examiner

*Primary Examiner* — Utpal D Shah
(74) *Attorney, Agent, or Firm* — Jon Gibbons; Fleit Intellectual Property Law

(57) ABSTRACT

A system to detect LEDs and their states in an AR context is provided having a monitored device having a plurality of LEDs; a computer receives a picture of the monitored device and LEDs; the computer processes said picture to determine a plurality of feature points; a database is in data communication with said computer that stores a plurality of reference images with reference feature points and reference zones; the computer matches at least some of the plurality of feature points with at least some of the plurality of reference feature points to compute a homography matrix; the computer transforms the picture into a transformed picture using the homography matrix; the computer processes zones of the transformed picture based on the reference zones to determine the state of each of the plurality of LEDs by comparing a value of the picture in the zone with a reference value.

18 Claims, 6 Drawing Sheets

| Power LED | US/DS LED | online LED | 2.4 GHz LED | Higher-level state | Notes |
|---|---|---|---|---|---|
| 0 | 0 | 0 | 0 | Power Off | |
| 1 | 0 | 0 | 0 | Powering On | |
| 1 | 0<x<1 | 0 | 0 | Booting | |
| 1 | 0<=x<=1 | 0 | 1 | 2.4GHz Ready | |
| 1 | 1 | 0<x<1 | 1 | Establishing Link | |
| 1 | 1 | 1 | 1 | READY | |

FIG. 6

SYSTEM AND METHOD TO DETECT LEDS AND THEIR STATES IN AN AR CONTEXT

TECHNICAL FIELD

The present disclosure relates to a system and method to detect LEDs and their states in an augmented reality context. More particularly, the present disclosure relates to a system and method for decoding LEDs for non-expert users in augmented reality workflows.

BACKGROUND

Augmented reality systems can be used to provide users with instruction workflows that help a user to perform tasks. Tasks can include validation steps, where the system can help detect whether the desired result of the task has been completed.

The "desired result"—or "end state" may be a special case of what can be termed "object states." An object state can be any detection of an object which can be differentiated from other states. For example, an object state might comprise a door which is open or closed, or a switch which is on or off.

Object states may be detected using a computer vision approach which employs deep learning networks. Currently, object states are only used to confirm that a task has been accomplished, for example if the back door of a printer has been opened, or if a toner drum has been removed. However, the notion of object state can be thought of as the 'context' of the object that allow an understanding of a global state of an object.

In addition, in augmented reality service workflows, there is a need to decode information for a non-expert user. Sometimes that information is coded as blinking lights, for example, the LEDs on a network switch or modem. There are many examples of the use of LEDs in electronic systems.

SUMMARY

Accordingly, what is needed is a system and method to detect LEDs and their states in an augmented reality context.

The system and method should minimize the chance of misdetection of an LED state, not be cumbersome or overly computationally expensive, and avoid confusing multiple LEDs on a single panel.

In one aspect of the present disclosure, a system to detect LEDs and their states in an AR context is provided having a mobile device having a camera. The camera is configured to take a video of a monitored device having a plurality of LEDs, the video having at least two frames. A computer in data communication with said mobile device is configured to receive said video. The computer is configured to process said video to determine a plurality of feature points in each frame. A database is in data communication with said computer and is configured to store a plurality of reference images with reference feature points and reference zones. The computer is configured to match at least some of the plurality of feature points with at least some of the plurality of reference feature points to compute a homography matrix. The computer is configured to transform the image into a transformed image using the homography matrix. The computer is configured to process zones of the transformed image based on the reference zones to determine the state of each of the plurality of LEDs by comparing a value of the image in the zone with a reference value. The mobile device is configured to display the state of each of the plurality of LEDs.

In another aspect of the present disclosure, a system to detect LEDs and their states in an AR context is provided having a monitored device having a plurality of LEDs configured to indicate device states. A computer is configured to receive a picture of said monitored device and said plurality of LED. The computer is configured to process said picture to determine a plurality of feature points. A database is in data communication with said computer. The database is configured to store a plurality of reference images with reference feature points and reference zones. The computer is configured to match at least some of the plurality of feature points with at least some of the plurality of reference feature points to compute a homography matrix. The computer is configured to transform the picture into a transformed picture using the homography matrix. The computer is configured to process zones of the transformed picture based on the reference zones to determine the state of each of the plurality of LEDs by comparing a value of the picture in the zone with a reference value.

Additional features and aspects of the present teachings will become apparent from the following detailed description of illustrative embodiments that proceeds with reference to the accompanying drawings. This summary is not intended to limit the scope of the present teachings, which is defined by the claims.

BRIEF DESCRIPTION OF THE DRAWINGS

FIG. 6 is a sample table showing individual LED states and their higher-level state.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any system configuration, device configuration, or processor configuration satisfying the requirements described herein may be suitable for implementing the system and method to validate task completion of the present embodiments.

For purposes of explanation and not limitation, specific details are set forth such as particular structures, architectures, interfaces, techniques, etc. in order to provide a thorough understanding. In other instances, detailed descriptions of well-known devices and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

Figure 1:
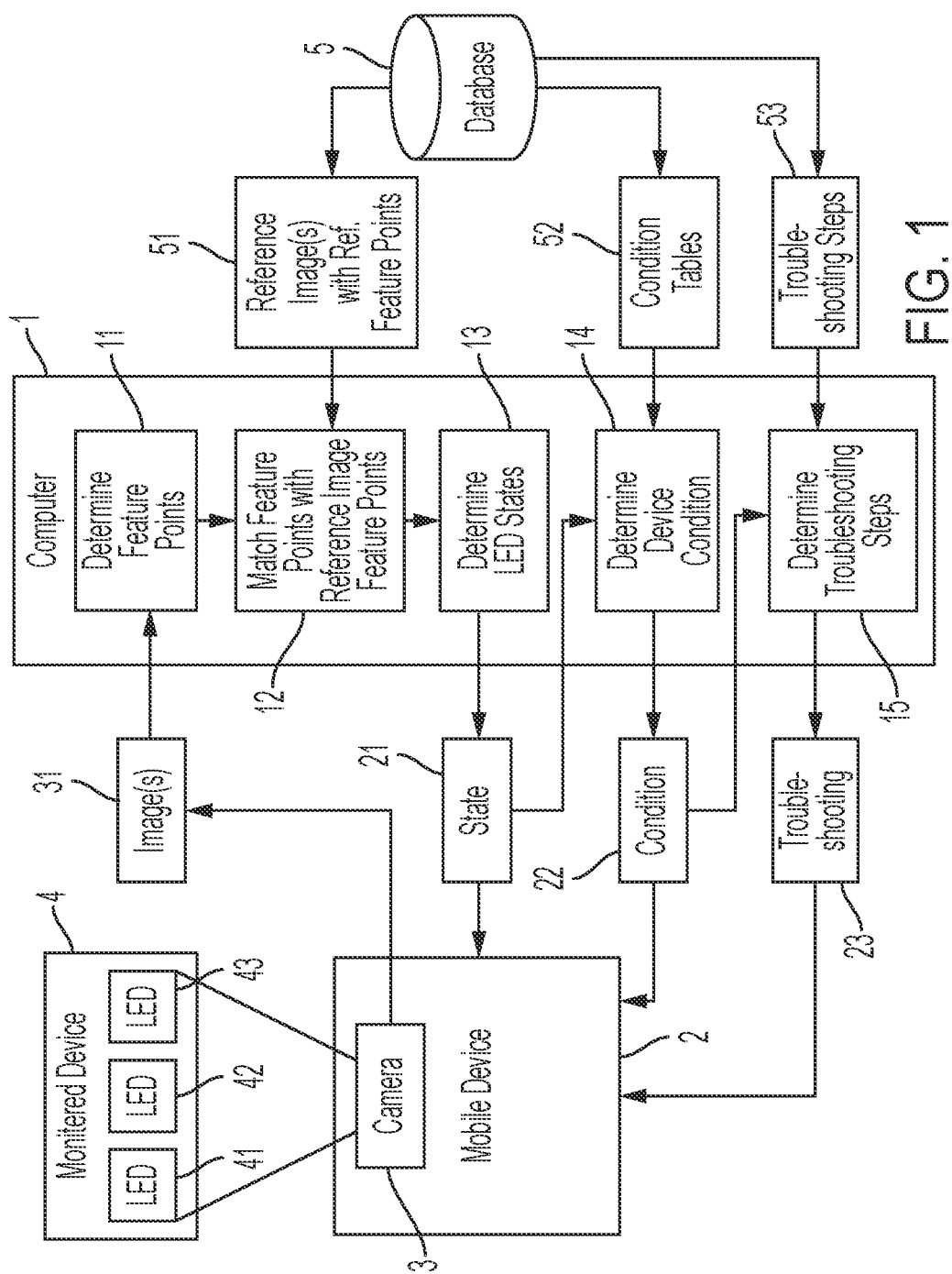
FIG. 1 is a schematic diagram of the present disclosure.

Referring to the figures in detail and first to FIG. 1, a system and method are provided to detect LEDs and their states in an augmented reality context. The system includes a computer 1, a device 4, and a database 5.

The computer 1 may include a processor, computer, remote computer, computer server, network, or any other computing resource. The computer 1 may include memory, input/output devices, storage, and communication interfaces—all connected by a communication bus. The storage may store application programs and data for use by the computer 1. Typical storage devices include hard-disk drives, flash memory devices, optical media, network and virtual storage devices, and the like. The communication interfaces may connect the system to any kind of data communications network, including either wired networks, wireless networks, or a combination thereof. The memory may be random access memory sufficiently large to hold necessary programming and data structures of the disclosed subject matter. The memory may constitute a single entity or comprise a plurality of modules. The input/output devices may be used to update and view information stored in a database 5, as described later in more detail The computer 1 may be in communication with the mobile device 2. The mobile device 2 may be a computer, desktop computer, laptop, smartphone, tablet, or other electronic device capable of transmitting data to or receiving data from the computer 1. The mobile device 2 may include a processor, computer, remote computer, computer server, network, or any other computing resource.

The system may be configured to communicate through a network with the mobile device 2 that is associated with a user who is using the system. The network may comprise a local-area network (LAN), a wide-area network (WAN), metropolitan-area network (MAN), and/or the Internet, and further may be characterized as being a private or public network. The mobile device 2 may be a mobile phone, smart glasses, AR/VR glasses, personal digital assistant, tablet, laptop, or the like. However, in other embodiments, the mobile device 2 may be a non-mobile device, for example a desktop computer. The mobile device 2 contains an application(s) which, when executed by a processor of the mobile device 2, delivers information from the system to the user and provides real-time guidance. The application(s) of the mobile device 2 generates graphical user interfaces for presenting information regarding the system, as discussed in more detail below, and facilitates user interaction with the graphical user interfaces(s) as described herein.

The mobile device 2 may have a camera 3. The camera may be capable of taking still photographs or video. For example, the camera 3 may include a CCD sensor, a CMOS sensor, or a combination of both. The camera 3 is adapted to capture at least one static image, or a video (a plurality of moving images), or a combination of both of the monitored device 4. The mobile device 2 may transmit the images 31 from the camera to the computer 1. The transmission may be real-time or may be delayed. Alternatively, the mobile device 2 may be a camera 3, and the images 31 may be stored in memory before being accessed for use as part of the system.

The camera 3 is used to take images 31 of a device 4. Device 4 may be any type of device with light indicators 41, 42, 43, etc. Light indicators 41, 42, 43, etc., are preferably LEDs, given their incorporation into many devices today. For example, device 4 may be a modem, router, printer, laptop, refrigerator, cable (such as CAT5) or any other device that uses LEDs to communicate status. The number of LED indicators on the device may vary.

Each LED indicator may correspond to a state of the device. For example, an LED may show if a device is on or off. Some LEDs may blink to communicate a state. Some LEDs may change colors to communicate a state. Combinations of LED states may indicate a condition of the device 4. For example, where the device is a router, an LED may be used to show an ON/OFF state, whether the router is transmitting/receiving, whether the router is connected to the internet, or whether the router has devices connected.

The computer 1 may also be in communication with a database 5. The database 5 may store information regarding the system. The database 5 may be a storage drive or array accessible to computer 1, or cloud storage. The database 5 may be integrated into the computer 1, or the mobile device 2. The database 5 may store reference images with reference feature points and reference zones 51, condition tables 52, and troubleshooting steps 53.

The computer 1 receives an image 31 taken by camera 3. This may be a still photograph or a frame of a video. The image 31 may be received over a network, such as the Internet, a WAN, a LAN, Bluetooth, or any other known network. The image 31 may be received via a memory card or USB memory device. Any receiver may forward the image 31 to the computer 1.

The computer 1 may use deep learning to recognize objects in the image 31. The deep learning may comprise a machine learning processor, a deep learning accelerator, an AI accelerator, and/or neural processor. The deep learning may be built on machine learning and/or artificial intelligence and may be based on artificial neural networks with representation and/or reinforcement learning. In some embodiments, the deep learning is a separate deep learning machine that uses neural networks. In some embodiments, the deep learning module may comprise computer instructions executable on a processor for determining an object. The deep learning module may include computer vision (with pattern recognition capability, for example) and may be trained to visually detect objects/components of the monitored device and their respective states and conditions from the image(s) 31. In addition, or alternatively, the deep learning may be trained to visually detect the monitored device as a whole and determine its state or condition from the image(s) 31.

The deep learning is configured to analyze the image 31, specifically identifying an object of the monitored device 4 within the image(s) 31 and detecting a state of the object by comparing the image(s) 31 to at least reference data 51. For example, in systems that use homography-based image alignment and registration, the database 5 may store reference images with reference feature points and reference zones. The reference data 51 may include predetermined labels and bounding boxes for an object of a monitored device 4. To generate reference images with reference feature points and reference zones 51, a picture is taken from a detected object bounding box to configure the detection parameters. Parameters may be generated to indicate where objects are in the sub-image defined by the bounding box.

Feature points 51 may be extracted and saved from the sample image using a known algorithm, for example SIFT or SuperPoint.

Figure 4:
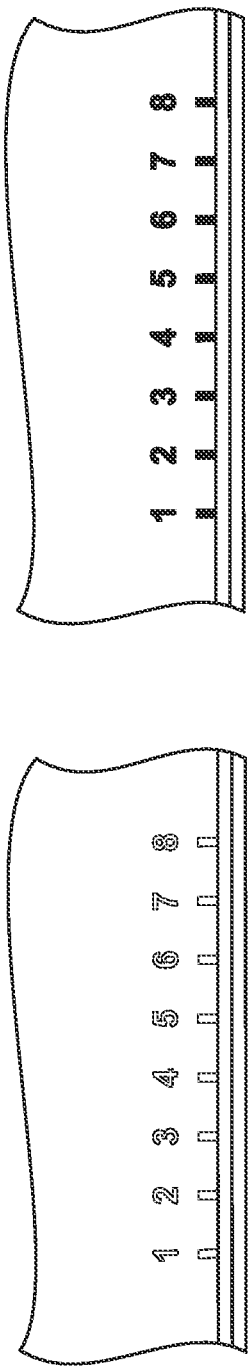
FIG. 4 is an example of an LED panel on an electronic device, with all LEDs turned on (on the left) and off (on the right).

In such a system, the computer 1 may retrieve reference images with reference feature points and reference zones 51 from the database 5. A sample reference image is shown in FIG. 4. The reference images with reference feature points and reference zones 51 may include predetermined labels and bounding boxes for an LED panel of a device 4. To generate reference images with reference feature points and reference zones 51, a picture is taken from a detected 'LED panel' bounding box to configure the LED detection parameters. Deep learning may be used to identify the LED panel and specific LEDs. Parameters may be generated to indicate reference zones where LEDs are in the sub-image defined by the bounding box, and the colors of the LEDs. Feature points 51 may be extracted and saved from the sample image using a known algorithm, for example SIFT or SuperPoint.

The following text shows an example of an LED configuration:

```
{
    "Colors":[[254,79,6],[248,72,3]],
    "Locations":[[[95,117],[112,145]], [[132,117],[149,146]]]
    "Names":[« LED1 », « LED2 »]
}
```

Colors indicate the range of RBG values for LED ON colors to detect. Locations indicate the relative locations of LEDs in reference config image. Names indicate the LED name and can be related to semantics of an LED, e.g., a power LED or a switch activity LED, or some other status.

The computer 1 determines feature points 11 of the image 31. This may be performed by using a deep learning model for object detection that has been trained to detect the objects and states of a particular product. The deep learning model for object detection may determine a bounding box whose label is associated with an 'LED panel' in an image. The computer 1 may then extract a sub-image and determine feature points using a known algorithm (e.g., SIFT or SuperPoint). Notably, if an image 31 is framed to only capture the LED panel, no sub-image is necessary, and image 31 is used.

Figure 2:
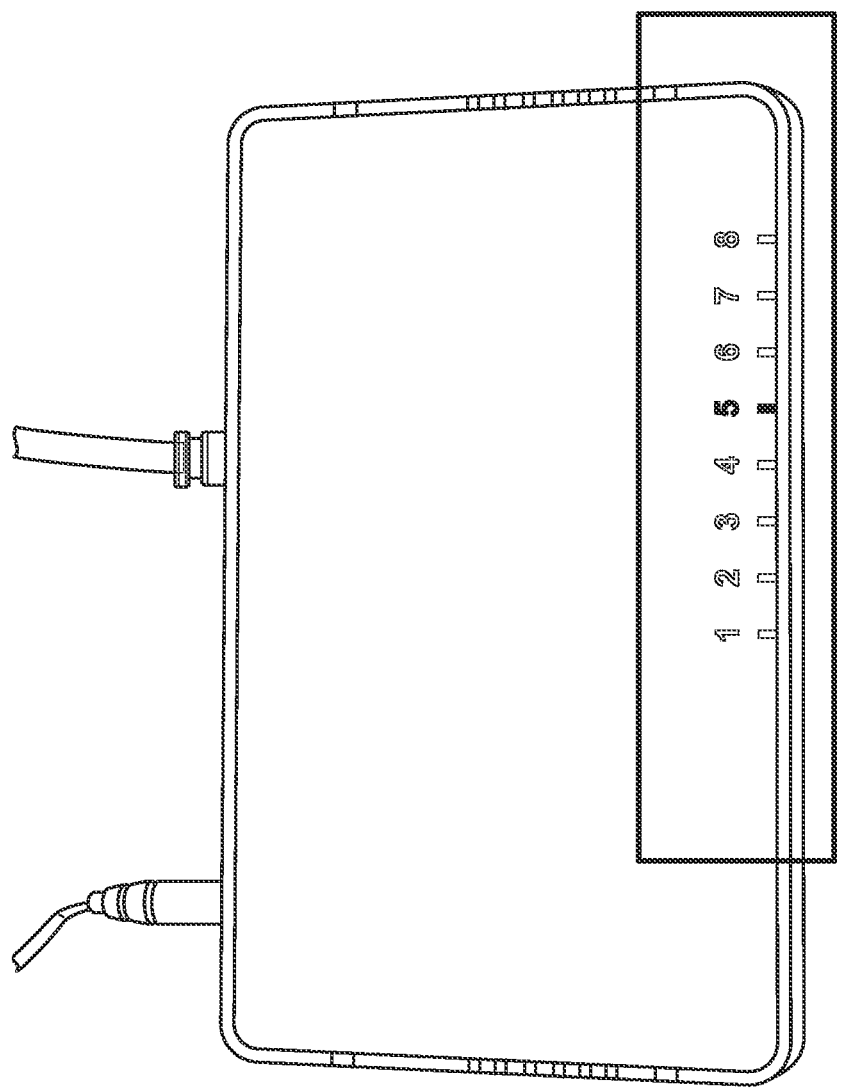
FIG. 2 is an example of an LED panel on an electronic device.
Figure 3B:
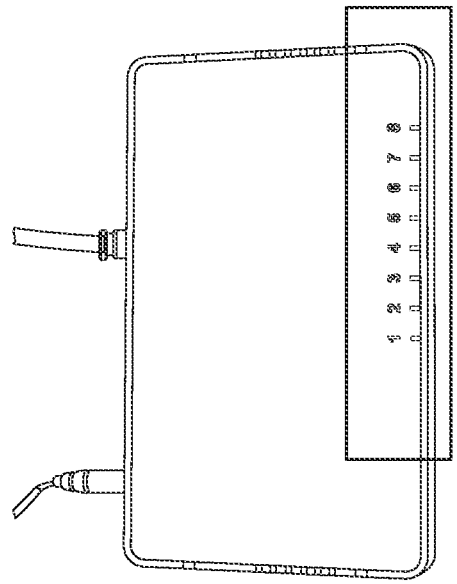
FIG. 3A-3C show an example of an LED panel on an electronic device, with LED 5 turned on, turned off, and turned on again.
Figure 3C:
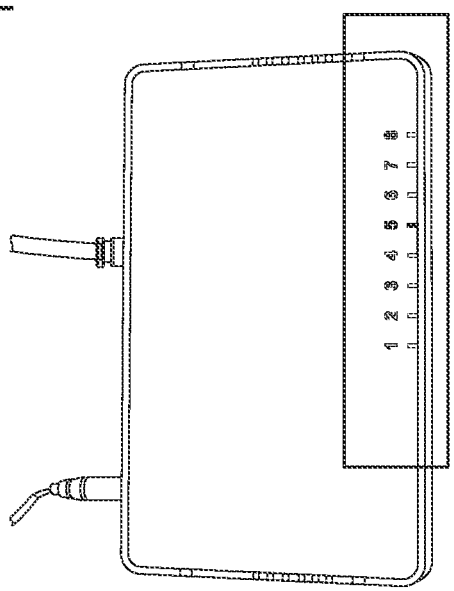
Figure 3A:
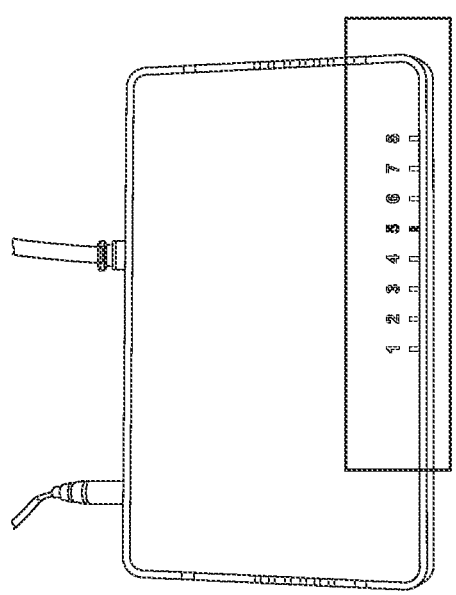

A sample image 31 of a device 4 is shown in FIG. 2. A bounding box is shown around the LED panel. Sample video frames are shown in FIG. 3A-3C, which show LED 5 blinking.

Figure 5:
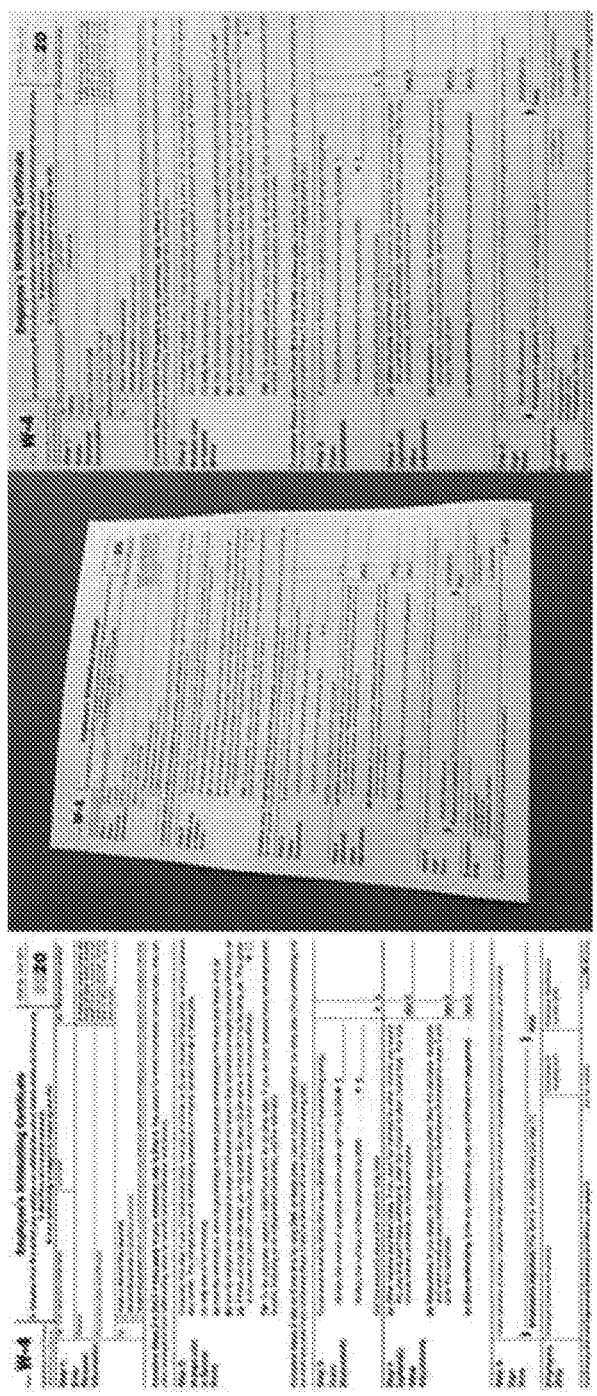
FIG. 5 is an example of a standard document (on the left), an image of a printout of that document (in the middle), and the result of homography of the image (on the right).

Image 31 is likely different from the reference image 51 in terms of the frame of reference. Therefore, there is a need to match image 31 to reference image 51. Image alignment and registration is known and can be performed using homography. Homography works by capturing feature points and descriptions in a reference image, then matching them in a scanned sample, then creating a transform that warps the sample image to the reference image (or vice versa). Homography may be used to determine a homography matrix to transform one image into the same perspective as another. As shown in FIG. 5, a known standard image may be provided on the left. An image, scan, or printout of that image may be provided in the middle. A corrected and remapped version of the image after homography is performed is shown on the right.

The computer 1 may match the determined feature points 11 with the reference image feature points 51. Upon doing so, the computer 1 may compute a homography matrix of image 31. The computer 1 may then use the reference zones 51 to determine where LEDs exist within the image 31. The computer 1 may isolate the LED zones for processing, using a sub-image of image 31.

The computer 1 may determine LED states 13. LED states 21 may include ON/OFF, color, and blinking. To do so, the computer 1 may warp reference LED zones from reference image 51 to locations on an extracted sub-image of image 31 using the computed homography matrix. This allows the computer to detect LED locations, or bounding boxes therefor, in a sub-image of image 31.

The computer may determine the ON/OFF state for each of the LEDs 41, 42, 43 in the image 31. Computer vision may be used to determine the ON/OFF state. For example, the value of certain properties of the image 31 the brightness, contrast, color, etc. in the region of the LED 41, 42, 43 may be compared to reference datum, such as reference values, and used to determine whether the LED is ON or OFF.

To determine color, the computer 1 may create a combined color mask from configured colors. The OpenCV in Range function, for example, may be used. The computer 1 may use connected component analysis on the color mask to detect LED color presence.

To determine whether an LED is blinking, the computer 1 may run a time series analysis on successive frames of video. For example, a rolling window of the last 10 LED states may be kept in memory by the computer 1. If the LED state is off for past 10 frames, the status of the LED is OFF. If the LED state is on for past 10 frames, then the status is ON. The status may be blinking if LED status is both on and off in last 10 frames.

The computer 1 may provide the determined state 21 of each or a subset of the LEDs to the mobile device 2. The mobile device 2 may display the state 21 of the LEDs to the user.

The computer 1 may combine LED states 21 into conditions 14 to provide a higher level meaning of the set of LED states. The computer may retrieve condition tables 52 from the database 5, a sample of which is shown in FIG. 6. The computer 1 may then determine the device condition 14. The computer pay provide the determine condition 22 to the mobile device 2. The mobile device 2 may display the condition 22 of the device 4 to the user.

As shown in FIG. 6, an example of four LEDs may be provided on a panel, which have the following meanings: Power, Up Stream/Down Stream, Online, and 2.4 GHz wireless. By combining the states of these LEDs, higher-level states ("conditions") can be determined, including: Power Off, Powering On, Booting, 2.4 GHz Ready, Establishing Link, and READY.

Optionally, the computer 1 may determine troubleshooting steps 15 based on the condition 22 of the device 4. Alternatively, the computer may determine troubleshooting steps 15 based on the state 21 of the LEDs, or any subset thereof. The computer may retrieve troubleshooting steps 53 from the database 5. Upon determining troubleshooting steps 23, the computer may provide them to the mobile device 2. The mobile device 2 may display the troubleshooting steps 23 to the user.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the disclosure and is not intended to limit the disclosure to a specific embodiment illustrated by the figures above or description below.

For purposes of explanation and not limitation, specific details are set forth such as particular architectures, interfaces, techniques, etc. to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first," "second," etc. for different features/components of the present disclosure are only intended to distinguish the features/components from other similar features/components and not to impart any order or hierarchy to the features/components. As used herein, the term "and/or" includes any and all combinations of one or more of the associated listed items. As used herein, the term "application" is intended to be interchangeable with the term "invention," unless context clearly indicates otherwise.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings. In describing the disclosure, it will be understood that a number of techniques and steps are disclosed. Each of these has individual benefits and each can also be used in conjunction with one, more, or all of the other disclosed techniques. Accordingly, for the sake of clarity, this description refrains from repeating every possible combination of the individual steps in an unnecessary fashion. Nevertheless, the specification and claims should be read with the understanding that such combinations are entirely within the scope of the claims.

What is claimed is:

1. A system to detect LEDs and their states in an AR context, comprising:
    a mobile device having a camera;
    the camera configured to take a video of a monitored device having a plurality of LEDs, the video having at least two frames;
    a computer in data communication with said mobile device;
    the computer configured to receive said video;
    the computer configured to process said video to determine a plurality of feature points in each frame;
    a database in data communication with said computer;
    the database configured to store a plurality of reference images with reference feature points and reference zones;
    the computer configured to match at least some of the plurality of feature points with at least some of the plurality of reference feature points to compute a homography matrix;
    the computer configured to transform the at least two frames into a transformed image using the homography matrix;
    the computer configured to process zones of the transformed image based on the reference zones to determine the state of each of the plurality of LEDs by comparing a value of the image in the zone with a reference value; and
    the mobile device configured to display the state of each of the plurality of LEDs.

2. The system of claim 1, further comprising:
    a table of conditions stored in said database;
    each condition being defined by a combination of LED states;
    the computer configured to compare the state of each LED to the table of conditions to determine a condition of the monitored device; and
    the mobile device configured to display said condition of the monitored device.

3. The system of claim 2, wherein the table of conditions includes troubleshooting information for states and conditions; and
    the mobile device configured to display said troubleshooting information for the determined condition.

4. The system of claim 1, further comprising:
    the computer configured to process only a subportion of the frames of the video that include the plurality of LEDs.

5. The system of claim 1, further comprising:
    the computer configured to process the at least one frame of the video to determine a bounding box in which the LEDs reside;
    the computer configured to process only the portion of the frame within the bounding box to determine the plurality of feature points;
    the computer configured to process only the portion of the frame within the bounding box to determine the state of each of the plurality of LEDs.

6. The system of claim 1, wherein the state of an LED can be indicated by the LED blinking; and
    the computer configured to process a plurality of frames to determine whether an LED is blinking.

7. The system of claim 6, the computer configured to process successive frames to determine whether an LED is blinking.

8. The system of claim 1, further comprising:
    a table of LED colors stored in the database;
    the computer configured to compare the color of at least one frame to the LED colors in the database to determine the state of the LED.

9. A system and method to detect LEDs and their states in an AR context, comprising:
    a monitored device having a plurality of LEDs configured to indicate device states;
    a computer configured to receive a picture of said monitored device and said plurality of LEDs;
    the computer configured to process said picture to determine a plurality of feature points;
    a database in data communication with said computer;

the database configured to store a plurality of reference images with reference feature points and reference zones;

the computer configured to match at least some of the plurality of feature points with at least some of the plurality of reference feature points to compute a homography matrix;

the computer configured to transform the picture into a transformed picture using the homography matrix;

the computer configured to process zones of the transformed picture based on the reference zones to determine the state of each of the plurality of LEDs by comparing a value of the picture in the zone with a reference value.

10. The system of claim 9, wherein the picture is provided to said computer by a mobile device.

11. The system of claim 9, further comprising a receiver configured to accept the picture from a remote device and transmit the picture to said computer.

12. The system of claim 9, wherein the picture is a still photograph, a video, or a frame of the video.

13. The system of claim 9, further comprising:
troubleshooting information for LED states stored in said database; and
the mobile device configured to display said troubleshooting information for at least one determined state.

14. The system of claim 9, further comprising:
a table of conditions stored in said database;
each condition being defined by a combination of LED states;
the computer configured to compare the state of each LED to the table of conditions to determine whether a condition appears in said picture; and
the mobile device configured to display said condition.

15. The system of claim 14, wherein the table of conditions includes troubleshooting information; and
the mobile device configured to display said troubleshooting information for the determined condition.

16. The system of claim 9, wherein matching the feature points with the reference feature points includes computing a homography matrix to warp the picture.

17. The system of claim 9, further comprising:
a table of LED colors stored in the database;
the computer configured to compare the color of at least one frame to the LED colors in the database to determine the state of the LED.

18. The system of claim 17, wherein the state of an LED can be indicated by the LED blinking; and
the computer configured to process a plurality of frames to determine whether an LED is blinking.

* * * * *